Dec. 19, 1961   G. PIESTER   3,013,803
BULK DRY FERTILIZER SPREADER
Filed Feb. 9, 1959   3 Sheets-Sheet 1

George Piester
INVENTOR.
BY *Clarence A. O'Brien*
and *Harvey B. Jacobson*

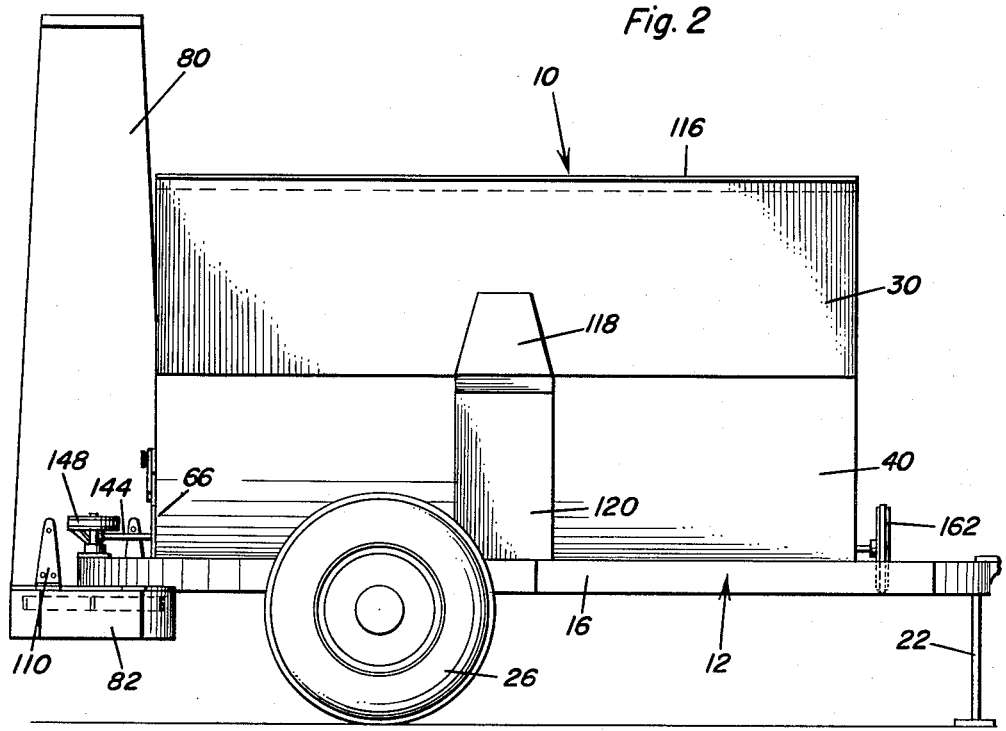
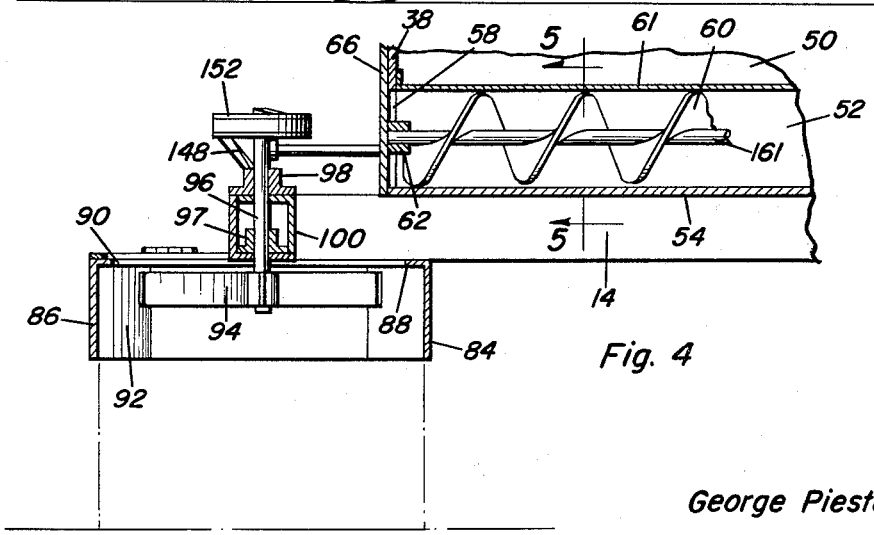

Dec. 19, 1961   G. PIESTER   3,013,803
BULK DRY FERTILIZER SPREADER
Filed Feb. 9, 1959   3 Sheets-Sheet 3
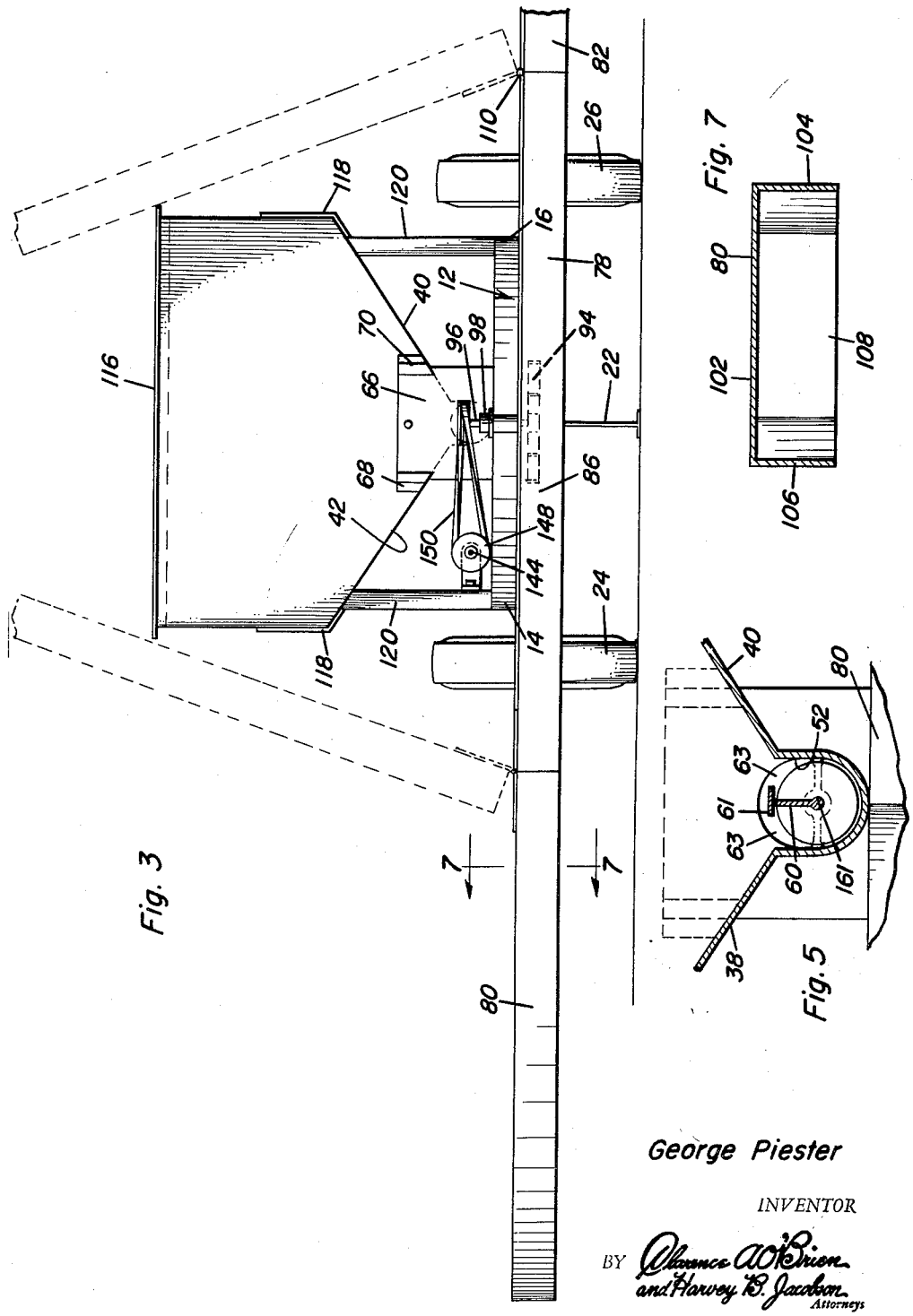
George Piester
INVENTOR

United States Patent Office 3,013,803
Patented Dec. 19, 1961

3,013,803
BULK DRY FERTILIZER SPREADER
George Piester, 608 N. Kearney Ave., Minden, Nebr.
Filed Feb. 9, 1959, Ser. No. 792,084
5 Claims. (Cl. 275—8)

This invention relates to distribution of dry pulverized or granulated fertilizer or the like.

An object of the invention is to provide a tractor pulled trailer which preferably but not necessarily, uses power from the tractor power take-off for propelling a feed auger and a broadcasting fan in a wagon type trailer supporting a copious quantity of fertilizer, distributing it over a wide area evenly and with a minimum of difficulty and effort.

Another object of the invention is to provide a fertilizer spreader which has a body within which to receive a quantity of fertilizer, the lower part of the body having sloping sides functioning as a trough within which a feeder auger is located. The fertilizer is positively and accurately as well as dependably delivered to a fan chamber in a distribution hood so that the fertilizer being delivered at a constant rate, is broadcast by the fan laterally in both directions with reference to the line of draft of the trailer.

An important feature of the invention is found in the hood for the broadcaster fan. The hood is made of a center section which is fixed to the chassis of the trailer and a pair of hinged end sections which are connected with the center section. The end sections may be hinged to an upright or an approximately upright position wherein the fertilizer spreader is not in use, and they may be lowered to an essentially horizontal position in alignment with the center section when spreading is taking place.

Another important feature of the invention is a speed control for the auger. A transmission is operatively connected in the drive train or drive line, this transmission functioning as a speed control for the auger so that the rate of feeding the broadcaster fan with fertilizer may be governed in accordance with the judgment of the fertilizer spreader operator.

Although there have been fertilizer spreaders proposed in the past, the fertilizer spreader in accordance with this invention possesses structural refinements and improvements lending to practicability, economy of construction and use and dependability.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the spreader in FIGURE 1.

FIGURE 3 is a rear view of the spreader in FIGURE 1.

FIGURE 4 is an enlarged sectional view taken approximately on the line 4—4 of FIGURE 1.

FIGURE 5 is a transverse sectional view taken on the line 5—5 of FIGURE 4.

FIGURE 7 is a transverse sectional view taken on the line 7—7 of FIGURE 3 and showing the hood construction.

Figures 1, 6:
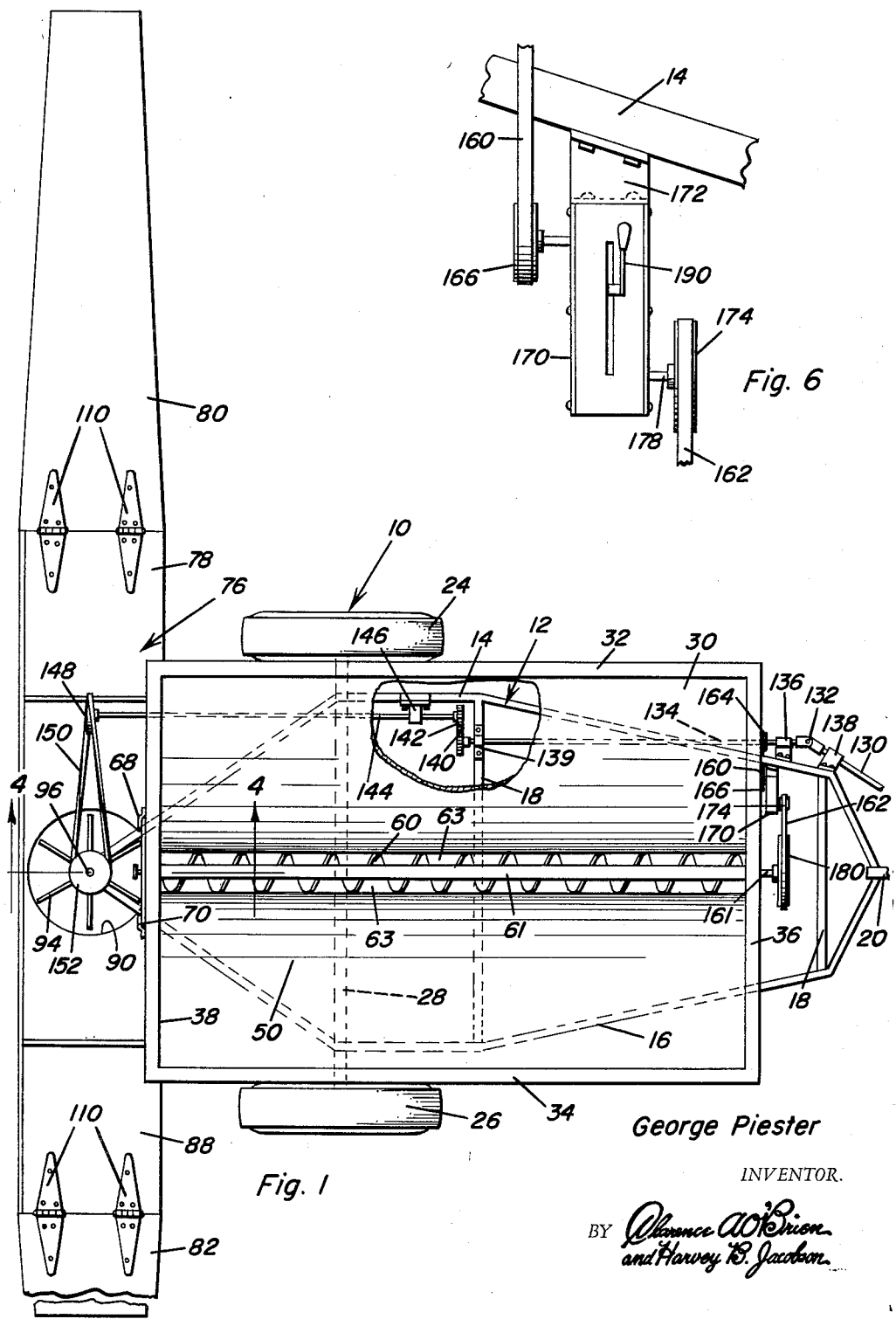
FIGURE 1 is a top view of a fertilizer spreader in accordance with the invention, parts being broken away to illustrate otherwise hidden details of construction.
FIGURE 6 is an enlarged fragmentary plan view of a typical speed control mechanism for the feed auger.

Fertilizer spreader 10 is shown in the drawings. Although the trem "fertilizer" is used herein, it is to be clearly understood that substances other than fertilizer may be distributed. Spreader 10 has a chassis 12 made of sides 14 and 16 together with a number of cross members 18 to rigidify the chassis. A tongue 20 is at the forward end of the spreader, and it has a stand 22 separably or pivotally connected therewith to hold the front of the spreader in an elevated position when the spreader is not being used. Two wheels 24 and 26 are mounted on the ends of axle 28 which is secured to chassis 12 intermediate the forward and rear end thereof.

The spreader box 30 has side walls or sides 32 and 34 together with front end wall 36 and rear end wall 38. The sides 32 and 34 have sloped lower parts 40 and 42 (FIGURE 3) forming an upwardly opening generally V-shaped trough 50 in registry with an upwardly opening auger trough 52. The auger trough may be constructed with vertical sides and a bottom wall 54, but for economy of construction the sides of the auger trough may be simply portions of the side wall parts 40 and 42. In either case, there is a discharge opening 58 at the lower end of wall 38. Feed auger 60 located in trough 52, is mounted for rotation in end bearings 62 which are attached to the lower parts of walls 36 and 38. Elongate shield 61 is mounted above the auger and is narrower than the open top of trough 52 thereby forming slotted entrances 63 to trough 52 on both sides of the shield. Discharge opening 58 is controlled by gate 66, the latter being vertically movable in rails 68 and 70 (FIGURE 1) which are fixed to the rear wall 38 of the spreader box. The gate may be held to adjust the effective size of discharge opening 58, or the gate may be left in the fully open position or the fully closed position depending on the desires of the operator.

Hood or scattering guide means 76 is attached to the rear part of chassis 12. The hood is made of a center section 78 and outrigger sections 80 and 82. The center section is formed of a downwardly opening channel having sides 84 and 86 together with an upper wall 88. The upper wall has a central opening 90 located beneath and directly behind discharge opening 58 so that the fertilizer fed by auger 60 is expelled into opening 90. This opening is in communication with a broadcaster fan chamber 92 containing fan 94 that is mounted for rotation. The fan has a vertical shaft 96 passed through and supported by bearings 97 and 98. The upper bearing 98 rests on the top wall of a bearing box 100 while the lower bearing 97 rests on the lower wall of bearing box 100. The bearing box may be made as a part of the chassis sides 16 and 14 at their rear juncture (see FIGURES 1 and 4). This provides an economical highly satisfactory method of mounting the fan 94.

Outrigger sections 80 and 82 are of identical construction. Each is composed of a downwardly opening channel having an upper wall 102 and a pair of side walls 104 and 106 (FIGURE 7) fixed to the outer edges thereof. The outrigger sections are widest at their connection with the center section of the hood and they taper gradually to the end wall 108. Hinges 110 attached to the upper wall 102 and to the upper wall 88 of the outrigger and center section respectively are used to fasten the outrigger section to the center section of the hood. In this way the outrigger sections may be lowered to an approximately horizontal position at which the side walls of the outrigger sections abut the side walls 84 and 86 of the center section of the hood. Further, the outrigger sections may be elevated by hingedly moving them to a point at which they contact the upper edges of the spreader box (FIGURE 3), these upper edges preferably being reinforced by a flange 116. Reinforcing may be used throughout wherever it is found necessary. For example, there are reinforcing plates 118 at the sides of the spreader box where it is supported by upright support braces 120 that are attached to chassis 12 and to the spreader box side walls.

The drive line for actuating the broadcaster fan and the feed auger is seen best in FIGURE 1. Shaft 130 is adapted to connect with a source of available motive power, for example the tractor power take-off. Universal joint 132 and shaft 130 couple lay shaft 134 therewith. Bearings 136 and 138 on opposite sides of the universal joint 132 help support shafts 130 and 134, there being an additional bearing 139 on one of the cross members 18 adjacent to the inner end of the shaft 134. Enmeshed gears 140 and 142 are attached to shaft 134 and 144 respectively drive shaft 144 that is supported in bearings 146 being attached to the chassis of the fertilizer spreader. The rear end of shaft 144 has a pulley 148 secured to it, and there is a belt 150 entrained around pulley 148 and around pulley 152. The pulley 152 is secured to the upper end of fan shaft 96 so that when the shaft 130 is driven, there is a corresponding rotation of the fan 94.

Feed auger 60 is driven from shaft 134 so that there is a correspondence in speed between the feed auger 60 and the fan 94. One method of driving the auger is to use a pair of belts 160 and 162, the belt 160 being entrained around pulleys 164 and 166 attached respectively to shaft 134 and an adjustable speed transmission 170. This transmission may vary in design and may be of the mechanical or fluid type. In either case the transmission is suitably mounted on a bracket 172 attached to a part of the chassis. Belt 162 is entrained around pulley 174 on the output shaft 178 of the transmission 170. Belt 162 is also entrained around pulley 180 which is secured to the auger shaft 161 on the exterior of the spreader box 30. It is now evident that the speed ratio between fan 94 and the feed auger 60 may be altered by adjustment of the hand lever 190 of transmission 170. For the most economical construction, transmission 170 may be omitted, together with the pulleys attached thereto. In its place a single belt entrained around pulleys 169 and pulley 180 (assuming them to be in the same vertical plane) may be substituted. Such a single belt may be a slipping belt and tightened by means of a belt tightener to control the amount of slippage and thereby control the speed of operation of feed auger 60. A number of other types of speed controls may be adopted, there being a large number known in the art.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A spreader comprising a frame, a spreader box mounted thereon and having end walls interconnected by side walls converging downwardly toward a bottom, trough means connected to said side walls at the bottom thereof, feed means rotatably mounted entirely within said trough means, shield means connected to the end walls and disposed between the bottom of said side walls thereby forming a restricted inlet to said trough means and feed means, gate means slidably disposed on one of said end walls at one end of said trough means forming a vertically adjustable, restricted outlet for said trough means, scattering guide means secured to said frame and having an opening therein disposed beneath and in overlapping relation to the outlet of said trough means, scattering means rotatably mounted by said frame within said guide opening for directly receiving material dispensed through the outlet of said trough means.

2. The spreader as defined in claim 1, further including drive means operatively connected to said scattering means and variable speed transmission means operatively connecting said drive means to said feed means for varying its speed relative to the scattering means.

3. The spreader as defined in claim 1, wherein said guide means includes a central hood portion and lateral extensions hingedly connected to the central portion, disposed so as to be folded upwardly against the spreader box.

4. The spreader as defined in claim 1, further including drive means operatively connected to said scattering means and variable speed transmission means operatively connecting said drive means to said feed means for varying its speed relative to the scattering means, and said guide means including a central hood portion and lateral extensions hingedly connected to the central portion, disposed so as to be folded upwardly against the spreader box.

5. The combination of claim 1, wherein said scattering means includes a scattering fan disposed below the guide opening in overlapping relation to the outlet of the trough means, and fan drive means drivingly connected to the scattering fan through the guide opening and mounted by the frame above the guide means.

References Cited in the file of this patent

UNITED STATES PATENTS

| Re. 22,020 | Fulkerson | Feb. 10, 1942 |
| 185,083 | Diltz | Dec. 5, 1876 |
| 771,104 | Sparks | Sept. 27, 1904 |
| 1,751,928 | Lachner | Mar. 25, 1930 |
| 2,281,212 | Stoltzfus | Apr. 28, 1942 |
| 2,586,492 | Ulrich | Feb. 19, 1952 |
| 2,614,849 | Holben | Oct. 21, 1952 |
| 2,619,355 | Trees | Nov. 25, 1952 |

FOREIGN PATENTS

| 516,465 | Belgium | Jan. 15, 1953 |